No. 759,498. PATENTED MAY 10, 1904.
E. BÖSCH.
ART OF FILLING TEETH.
APPLICATION FILED JAN. 26, 1903.
NO MODEL.
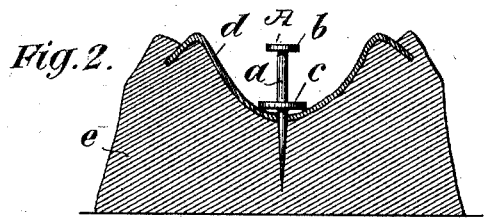
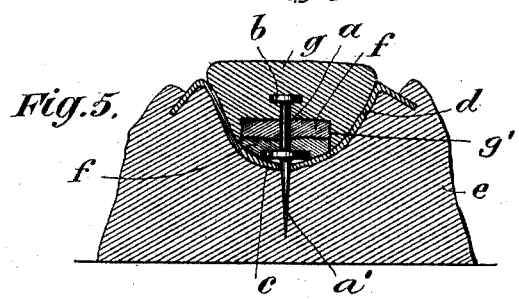
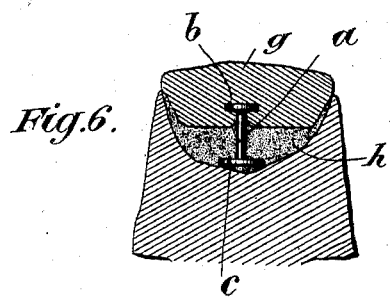
Witnesses:
Inventor:
Edward Bösch.

No. 759,498. Patented May 10, 1904.

UNITED STATES PATENT OFFICE.

EDUARD BÖSCH, OF GENEVA, SWITZERLAND, ASSIGNOR TO P. A. KÖLLIKER & CO., OF ZURICH, SWITZERLAND, A FIRM.

ART OF FILLING TEETH.

SPECIFICATION forming part of Letters Patent No. 759,498, dated May 10, 1904.

Application filed January 26, 1903. Serial No. 140,569. (No model.)

*To all whom it may concern:*

Be it known that I, EDUARD BÖSCH, a citizen of the Republic of Switzerland, residing at Geneva, Switzerland, have invented a new and useful Improvement in the Art of Filling Teeth, of which the following is a specification.

In the art of filling teeth to which this invention pertains it is very difficult to secure the filler in the cavity of the tooth by means of cement in a durable manner, and this is especially true when fillings of a vitrifiable substance, as a glass or porcelain composition, are used, as the cement will not as firmly adhere to a vitrified or glazed surface as it will to the walls of a cavity in a tooth.

This invention has for its object a process whereby a better and more durable connection between tooth and filling is obtained; and it consists, broadly, in securing to the filling before vitrification or firing an anchor, so that the filling may be anchored in the cement usually employed to cement fillings into the cavities of teeth.

That my invention may be fully understood I will proceed to describe the same in detail, reference being had to the accompanying drawings, in which—

Figure 1 shows in elevation a preferred form of anchor. Fig. 2 is a sectional view of one of the preliminary steps in the preparation or making of the filling. Fig. 3 shows in elevation and plan a cylinder used in the process. Fig. 4 is a sectional view illustrating the manner of perforating the cylinder shown in Fig. 3. Fig. 5 is a sectional view illustrating the step in the preparation of the filler before vitrifying or firing, and Fig. 6 is a like view showing the filler cemented in the cavity of a tooth and anchored in the cement.

In carrying out my invention I first obtain a mold from the cavity of the tooth by means of foil, either gold or platinum foil, which mold $d$ is embedded in a composition of matter $e$ adapted to set and harden or become hard under the action of heat. After the mold has been embedded in the material $e$ I place an anchor A, preferably of platinum, in position in the mold, said anchor consisting of a pin having a preferably discoidal head $b$, a shank $a$, preferably cylindrical and of uniform cross-section from the head $b$ to a collar $c$ of greater diameter than said head, and of a pointed portion $a'$, projecting centrally from the collar $c$, Figs. 1, 2, and 5. The pointed end of the pin is now inserted through the center of the mold $d$ into the material $e$ until the collar $c$ seats on the bottom of the mold-cavity, said material $e$ serving as a holder, and may consist of a mixture of one-third pure molding-sand and two-thirds plaster-of-paris mixed with water. I next perforate a cylinder $f$ of a more or less yielding or compressible refractory material—as, for instance, gold or platinum sponge—by means of a tapered tool $y$, as shown in dotted lines in Fig. 4, to form a tapering hole of sufficient diameter at its upper narrower end to adapt the cylinder to be slipped over the head $b$ of the anchor A and of approximately sufficient diameter at its lower wider end to encompass the collar $c$ of said anchor, after which the disk $f$ is lightly pressed around the collar $c$ and the shank $a$, as shown in Fig. 5. The length of the anchor A between the head $b$ and collar $c$ will depend upon the depth of the cavity to be filled, so that instead of one cylinder $f$ two or more may be required, care being taken to leave the necessary space above the cylinder or cylinders $f$ for the filling composition $g$, which may be a glass or porcelain composition or enamel, applied so as to fill the mold-cavity and inclose the cylinder or cylinders $f$, the shank $a$ above said cylinder or cylinders, and the head $b$ of the anchor, as shown in Fig. 5. The filling is now vitrified or fired, as the case may be, in the usual or any preferred manner, after which the mold $d$, with its support $e$, are removed, and the pointed end $a'$ of the anchor A is cut or sawed off as close to the collar $c$ as possible, and the cylinder or cylinders $f$ are then removed or dug out from above said collar, thus leaving a cavity in the filling $g$ around the shank $a$ of the anchor, the collar $c$ constituting the anchoring device for anchoring the filling in the cement $h$ by means of which the said filling is cemented into the cavity of a tooth.

From an inspection of Fig. 5 it will be seen that the filling composition around the disk or disks $f$ is merely a very thin shell, and when an increased cementing-surface is desired this shell or rim $g'$ is cut away, as shown in Fig. 6, which shows the filling $g$ cemented into the cavity of the tooth and anchored in the cement $h$.

Having thus described my invention, what I claim as new therein, and desire to secure by Letters Patent, is—

1. The method of filling teeth, which consists in taking an impression of the cavity to be filled, making a mold from the impression so taken, molding the filling, fixing an anchor in the filling and anchoring the filling in the cavity of the tooth, substantially as described.

2. The method of filling teeth, which consists in forming a suitably-shaped cavity, taking an impression of the cavity, making a mold from the impression, making the filling around an anchor in said mold, and anchoring the filling in the cavity, substantially as described.

3. The method of filling teeth, which consists in taking an impression in metal foil of the cavity to be filled, backing up the impression to form a mold, fixing an anchor in the mold and forming on the anchor the filling, removing the filling and anchor from the foil mold and then cementing the anchor and filling in the tooth, substantially as described.

4. The method of filling teeth, which consists in forming a suitably-shaped cavity, taking an impression thereof in metal foil, backing up the foil to form a mold, passing an anchor-pin through the foil into the backing, said anchor partly surrounded by a non-fusible removable packing, fusing the filling around the anchor and packing, removing the filling with the anchor attached from the mold, separating the non-fusible substance and cementing the filling in place in the tooth, substantially as described.

5. The method of filling teeth, which consists in forming a suitably-shaped cavity, taking an impression thereof in metal foil, backing up the foil to form a mold, passing an anchor-pin having a head and shank and a pointed portion projecting from a collar on the shank through the foil into the backing, said anchor partly surrounded by a non-fusible removable packing, fusing the filling around the anchor and packing, removing the filling with the anchor attached from the mold, removing the pointed portion of the anchor close to the collar, separating the non-fusible substance and cementing the filling in place in the tooth, substantially as described.

In testimony that I claim the foregoing as my invention I have signed my name in presence of two subscribing witnesses.

EDUARD BÖSCH.

Witnesses:
  LOUIS POUZETT,
  ADRIEN GALLAND.